(12) United States Patent
Rangarajan

(10) Patent No.: US 7,424,723 B2
(45) Date of Patent: Sep. 9, 2008

(54) SYSTEM AND METHOD FOR EXECUTING AN ARBITRARY FUNCTION FROM AN EXTERNAL PROCESS

(75) Inventor: Rajasekaran Rangarajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 10/697,604

(22) Filed: Oct. 30, 2003

(65) Prior Publication Data

US 2005/0097578 A1 May 5, 2005

(51) Int. Cl.
G06F 9/44 (2006.01)
(52) U.S. Cl. .................. 719/330; 719/312; 707/10; 709/216; 709/217
(58) Field of Classification Search ......... 719/310–313, 719/328, 330, 331, 316; 709/216, 217, 218, 709/219; 707/9, 10
See application file for complete search history.

(56) References Cited

U.S. PATENT DOCUMENTS

| | | | | |
|---|---|---|---|---|
| 5,375,241 A * | 12/1994 | Walsh | ................. | 719/331 |
| 5,915,112 A * | 6/1999 | Boutcher | ................. | 719/330 |
| 6,108,715 A * | 8/2000 | Leach et al. | ................. | 719/330 |
| 6,141,697 A * | 10/2000 | Hale et al. | ................. | 719/312 |
| 6,157,961 A * | 12/2000 | Kessler et al. | ................. | 719/315 |
| 6,167,565 A * | 12/2000 | Kanamori | ................. | 717/146 |
| 6,182,158 B1 * | 1/2001 | Kougiouris et al. | ................. | 719/328 |
| 6,243,738 B1 * | 6/2001 | Hayles et al. | ................. | 709/203 |
| 6,289,391 B1 * | 9/2001 | Smith et al. | ................. | 719/312 |
| 6,718,550 B1 * | 4/2004 | Lim et al. | ................. | 710/310 |
| 6,728,788 B1 * | 4/2004 | Ainsworth et al. | ................. | 719/330 |
| 6,751,798 B1 * | 6/2004 | Schofield | ................. | 719/330 |
| 6,868,543 B1 * | 3/2005 | Nusbickel | ................. | 719/318 |
| 6,901,596 B1 * | 5/2005 | Galloway | ................. | 719/330 |

OTHER PUBLICATIONS

Li "Remote procedure Call", Feb. 2002, pp. 1-15.*
Otway, D., "Remote Execution: A Model for Process to Process Interactions", *Proceedings of the International Open Systems Conference*, Mar. 1987, 1, 363-376.
Robinson, P.G. et al., "Distributed Process Creation Within a Shared Data Space Framework", *Software-Practice and Experience*, Feb. 1995, 25(2), 175-191.

* cited by examiner

*Primary Examiner*—Van H Nguyen
(74) *Attorney, Agent, or Firm*—Woodcock Washburn LLP

(57) ABSTRACT

A first process executes a function in a second process. The second process may be a remote or local process. The first process may control the second process by executing a specified function in the second process. The first process may allocate space in the second process and create a stub function in the allocated space. The first process then may create a thread which runs the stub function. When the stub function is called from the first process, the stub function may call the arbitrary function, passing it the required parameters, thus enabling the first process to execute the desired function in the second process. The desired process may require any number and type of additional parameters and return any number and type of results.

17 Claims, 4 Drawing Sheets

SYSTEM AND METHOD FOR EXECUTING AN ARBITRARY FUNCTION FROM AN EXTERNAL PROCESS

FIELD OF THE INVENTION

The invention relates to computing and in particular to calling an arbitrary function in one process from another process.

BACKGROUND OF THE INVENTION

Software runs within an operating system concept called a process. A process may be an instance of a program running in a computer and may include the program code, private data, processor state (for example, the values in the processor registers) and so on. A process has one or more threads. A thread typically contains place holder information associated with a single instance of a multi-user program or a particular service request. For example, if multiple users are using a program, a thread may be created and maintained for each user or service request. Similarly, if, for example, a process is considered to be a container for a set of objects performing a function that performs several sub-functions, a separate thread may be created to execute each sub-function.

Some operating systems allow a process or thread within one process to call another function in another process. However, known techniques to accomplish this are limited in that typically functions that can be called in the other processes take only one parameter and return only one result of a particular type. This means that only certain functions (those that can take only one parameter and return a particular type of result) can be controlled remotely. It would be helpful if a more versatile method of controlling a function within a process from another process were available, so that any arbitrary function within a process could be controlled from another process.

SUMMARY OF THE INVENTION

A system, method and computer-readable medium containing computer-executable instructions enables one process to execute a function in another local or remote process, in some cases thereby enabling the first process to control the second process. The first process may allocate space in a second process and create a stub function in the allocated space The stub function may have a signature that is compatible with that of a mechanism that creates a thread in a remote process. The first process then may use this mechanism to create a thread in the second process which runs the stub function, identifying the function to execute by passing a pointer to an address to the stub function. When the stub function is called from the first process, the stub function may call the desired function, passing it the required parameters and receiving from it the results of execution of the function. The function to execute may require any number and type of input parameters and return any number and type of results. The stub function may then pass these results to the first process. This enables the first process to execute an arbitrary function in the second process and in some cases may enable the first process to control the second process.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

A system, method and computer-readable medium containing computer-executable instructions enables one process to execute an arbitrary function in another process. In one embodiment of the invention, a first process allocates space in a second process and creates a stub function in the allocated space. When the stub function is called from the first process, the calling function passes the stub function information from which the stub function can identify the function to execute and the value of any input parameters the function to be executed requires. The stub function calls the function to execute, passing it the required parameters, and returns the results to the calling procedure, thus enabling the first process to execute the desired function in the second process.

Exemplary Computing Environment

Figure 1:
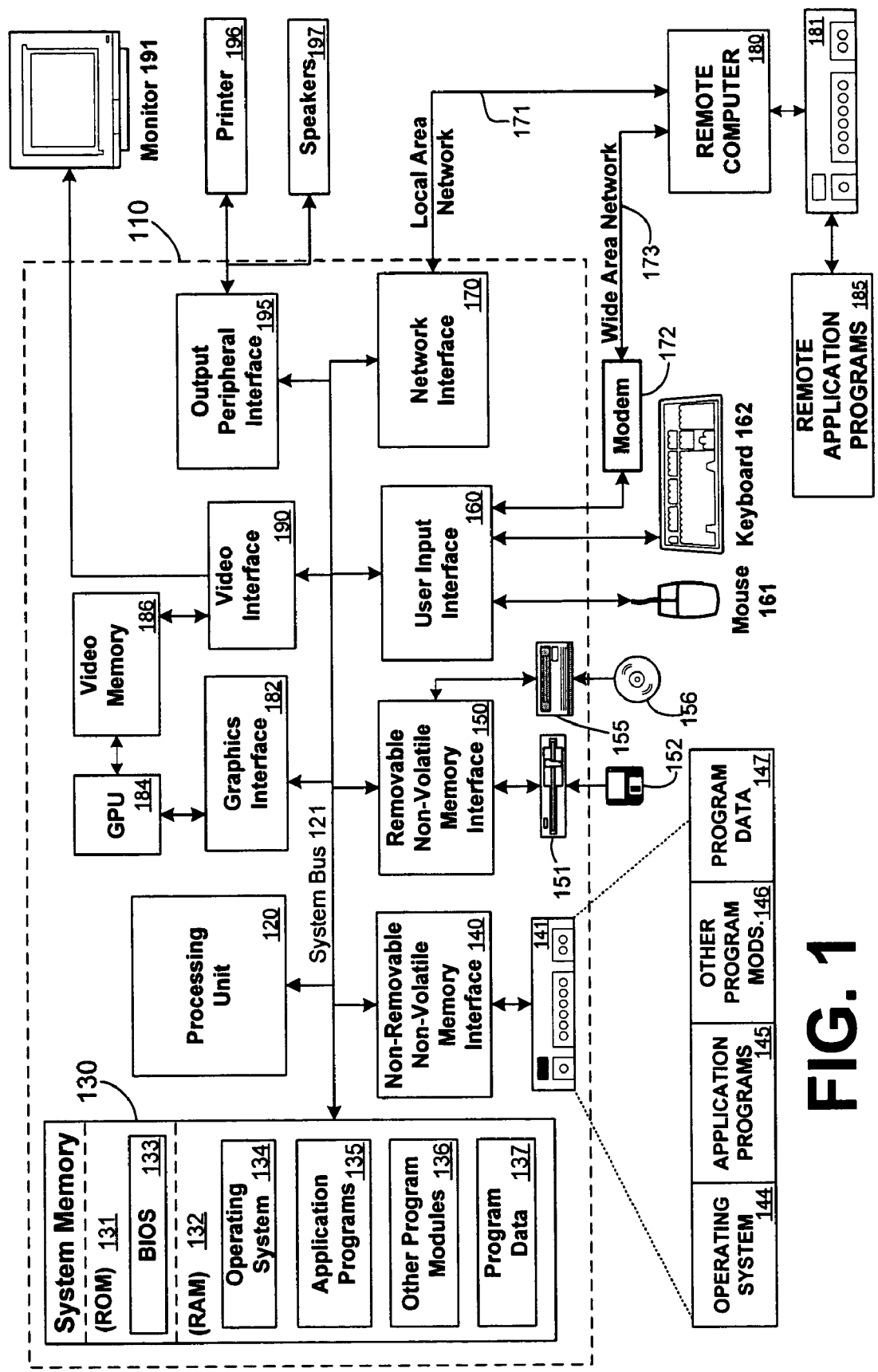
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

System and Method for Executing an Arbitrary Function in Another Process

Figure 2:
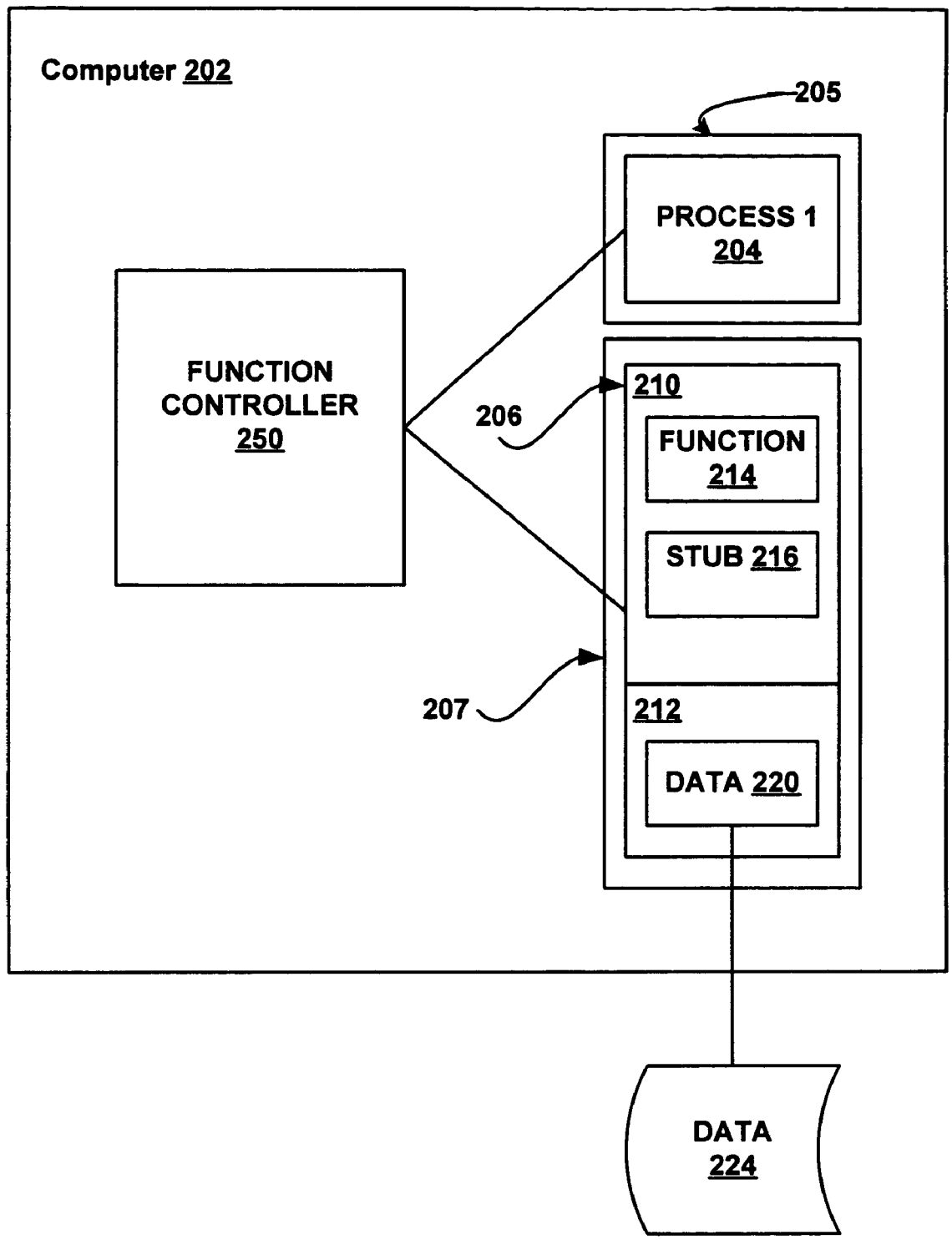
FIG. 2 is a block diagram of a system for executing an arbitrary function in another process in accordance with one embodiment of the invention.

FIG. 2 depicts an exemplary system for executing an arbitrary function in another process. Referring now to FIG. 2, computer 202 represents a computer such as the one described with respect to FIG. 1, on which function controller 250 may reside. Function controller 250 may allocate memory in a target process, insert a stub function into the allocated memory, execute the stub function, (for example, by creating a thread in the target process and passing the stub function information concerning the target function the stub function is to execute) and receive information from the stub function concerning the results of the execution of the target function. The memory allocated for a process is referred to as the process space for the process. Hence, process 1 204 may exist within process space 205 and process 2 206 may exist within process space 2 207. Both process 1 204 and process 2 206 may run on computer 202, or alternatively, process 1 204 and process 2 206 may run on different computers running within a computer network (not shown).

Process space 2 207 may include a first area 210 for executable code and a second area 212 for data. Within the first area 210 may reside executable code for one or more functions, such as function 214, etc., and one or more stub functions 216, etc. Within second area 212 may reside information, as depicted by data 220. This information may be associated with function 214, etc. and/or stub function 216, etc.

A stub function is typically a small program routine that substitutes for another (typically, but not necessarily, longer) program, that is to be loaded later or that is located remotely. For example, a program that uses a Remote Procedure Call (RPC) may be compiled with a stub that substitutes for the program that provides the requested procedure. The stub may, for example, accept the request, and forward it (possibly through another program) to the remote procedure. When the remote procedure has completed its service, the remote procedure may return the result or other status to the stub. The stub may then pass the result back to the program that made the request.

It will be understood, however, that within the context of the invention, stub functions such as stub function 216, etc. are not limited to these activities and may comprise any suitable code and perform additional functions as well as different functions than the ones discussed above and may be locally or remotely executed.

In some embodiments of the invention, stub function 216, etc. may have a specified signature. The specified signature may be compatible with a signature used by a function that creates a thread in a remote process.

One or more areas of data such as data 220 may comprise information that is generated as a result of running function 214, stub function 216 and so on. It will be understood that in addition to storing the result of function 214, in data 220, etc., this information may also or alternatively be stored elsewhere (as, for example, in stable storage media 224, (e.g., disk, tape, CDROM, etc.)), as shown in FIG. 2, representing function result data for function 214 stored externally to process space 2 207.)

Figure 3:
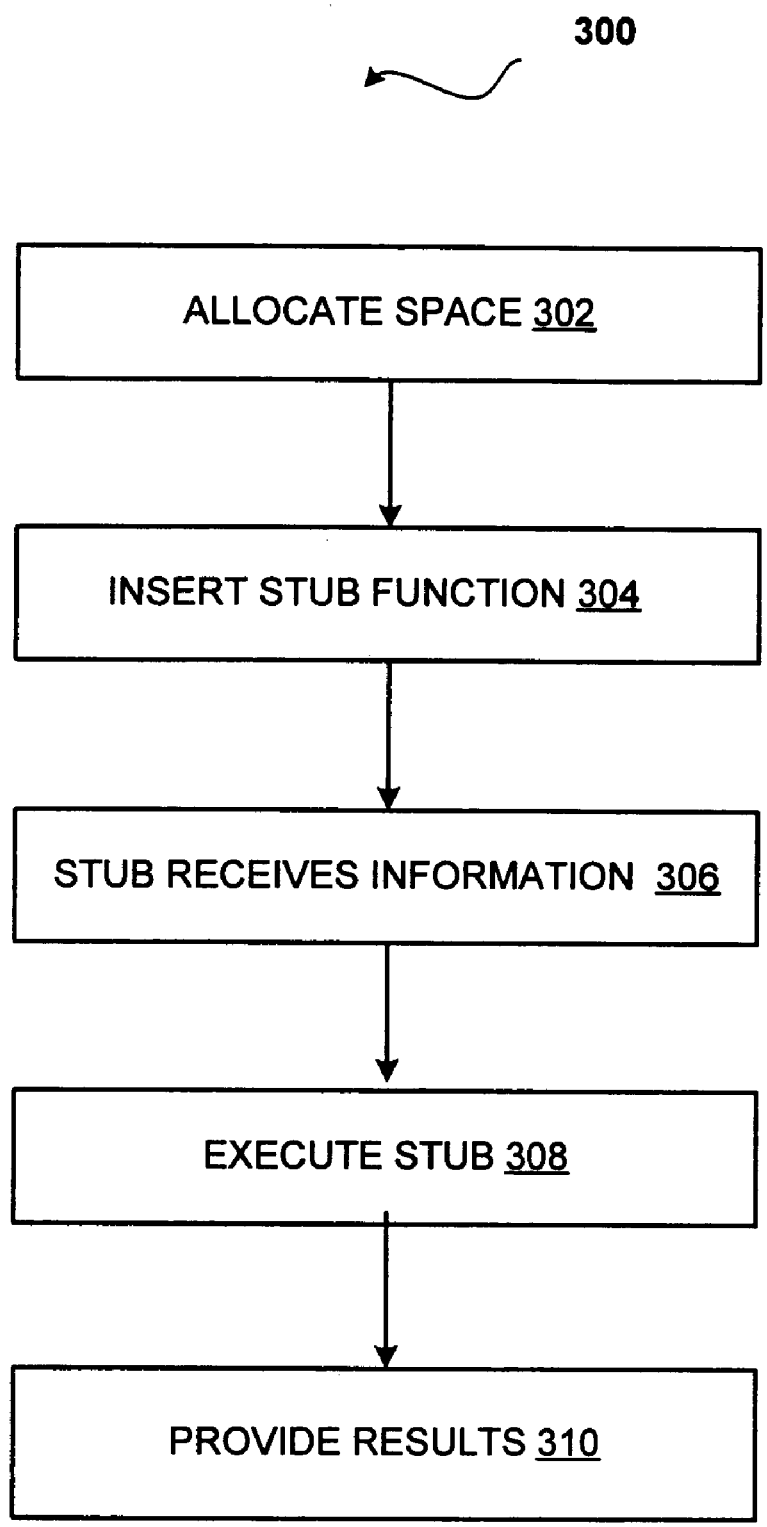
FIG. 3 is a flow diagram of a method for executing an arbitrary function in another process in accordance with one embodiment of the invention.

FIG. 3 is a flow diagram of an exemplary method 300 for executing an arbitrary function in another process in accordance with one embodiment of the invention. At step 302 space is allocated in a target process. In one embodiment of the invention, the target process represents a process to be controlled by a first (controlling) process. The controlling and target processes may be run on the same or different computers. The space allocated in the target process may be space in the executable area of the target process space, but may also include space in the data area of the target process space.

At step 304 a stub function is written into at least a portion of the allocated space. In one embodiment of the invention, the stub function that is written into the allocated space has a specified signature. An exemplary signature, for example, may use a particular calling convention that passes in one parameter and returns one 32-bit result. One exemplary signature for the stub function may follow the pattern:

```
DWORD WINAPI ThreadProc (
    LPVOID lpParameter
)
```

It will be understood that although the above is presented as it may be written in the C++ programming language, any suitable programming language, such as but not limited to C, Pascal, and Visual Basic may be employed to perform the above described task. The signature that is specified may be compatible with that expected by software that creates a remote thread.

The exemplary signature above may be interpreted as follows: "DWORD" is a 32 bit result of executing the function "ThreadProc". lpParameter is the name of the parameter that is passed to function ThreadProc. lpParameter is of type LPVOID, that is, lpParameter is a unspecified pointer. "WINAPI" is a specifier that may appear in front of a function declaration. Other specifiers include: _cdecl, _stdcall, _fastcall, etc. The specifier typically specifies a calling convention to be used.

A calling convention typically describes the number, arrangement and disposition of arguments for a procedure or function call. A particular programming language, for example, may require arguments to be pushed onto a stack or entered in registers in left-to-right or right-to left order, thus requiring the use of a particular calling convention. For example, programming language X may require an argument to be pushed onto a stack, requiring the use of calling convention A when writing in X because calling convention A pushes the argument onto a stack. Programming language Y may allow an argument to be pushed onto a stack or placed in a register thus allowing the use of either calling convention A or calling convention B, where calling convention B places the argument in a register. The calling convention also typically specifies whether the calling function or the called function is responsible for removing the arguments from the stack and performing other cleanup tasks. The calling convention may also determine the number of arguments allowed, or if a variable number of arguments is allowed and how one or more arguments are passed to the function and how one or more values are returned by the function. It also may specify how the function name is decorated.

Referring again to the exemplary signature above, characteristics of the WINAPI calling convention, for example, may include:

arguments are passed from right to left, and are placed on a stack;

stack cleanup is performed by the called function; and function name is decorated by prepending an underscore character and appending a '@' character followed by the number of bytes of stack space required.

When the stub function is called, the stub function is passed information, (e.g., a parameter), from the calling function (306). The stub function may interpret this information to be a pointer to an address in memory, (e.g., the stub function may receive a parameter which the stub function interprets to be a pointer, regardless of the type of the parameter) or other information identifying the function to be executed by the stub function. In one embodiment of the invention, a pointer to an address in memory is passed to the stub function and the function to be executed is located at that address. Alternatively, a pointer to an address, in memory may be passed to the stub function and at that location may be stored a data structure comprising the address of the location of the function to be executed and the location of one or more parameters needed, if any, by the function to be executed. The location of the parameters may be specified as offsets from the location of the function to be executed.

At step 308, the stub function is executed. In one embodiment of the invention, a thread is created which executes the stub function. The stub function dereferences the parameters associated with the function. As used herein, to "dereference" means to access the thing to which a pointer points or to follow the pointer. For example, in the C programming language, the declarations:

```
int i;
int *p = &i;
``` declares i as an integer and declares p as a pointer to the integer i. p is initialized to point at i ("&i" is the address of i—the inverse of "*"). The expression *p dereferences p to yield i as an lvalue, that is, an element that can appear either on the left of an assignment statement or anywhere an integer expression is valid. Thus, the statement

*p=17;

would set i to 17.

The address in memory pointed to by the parameter passed to the stub function may include any or all of the following information, the name and or physical location in the target process space of the function to be executed, the number of input parameters the function to be executed takes, the size of input parameters the function to be executed takes, the location of input parameters the function to be executed takes, and the type of input parameters the function to be executed takes. The stub function may also determine characteristics of the results of running the function to be executed, such as where the results of the function are to be stored, (such as a location in memory or in a file on stable storage or in a table in a database. It may also include the size of the result, the number of results, the type of results, the file name of a result file, a database name or table name of a database result, the path name or folder name where a result is to be stored and so on.) Thus, the stub function may determine from the received parameters what function to call, what parameters to pass to the function, how many parameters to pass to the function, where to place the results of executing the function or where to look to find that information.

At step 310 results are returned from the function that executes to the stub function. The stub function may pass the results to the calling function in the controlling process or store the results in a specified location and send the location to the controlling process.

Suppose for example, process 1 is a tool that lists all the threads running in a second process. Process 1 may call a stub function in the second process, which upon execution calls a function within the second process that lists all the threads running in the second process. The called function in the second process may return the list of threads to the stub function which returns the list of threads to process 1 or stores the list of threads at a location passed to process 1. The location at which the list of threads are stored may be a location in memory or an external location.

Similarly, process 1 may be a tool that lists all the threads running in all the processes running on a computer network. Process 1 may call stub functions in each of the processes running on the network, each stub function thus returning a list of threads running in its process (e.g., a target process) to process 1 (the controlling process). The stub function may return the list of threads to process 1 or may writing the list of threads at a specified location and pass the location to process 1.

Figure 4:
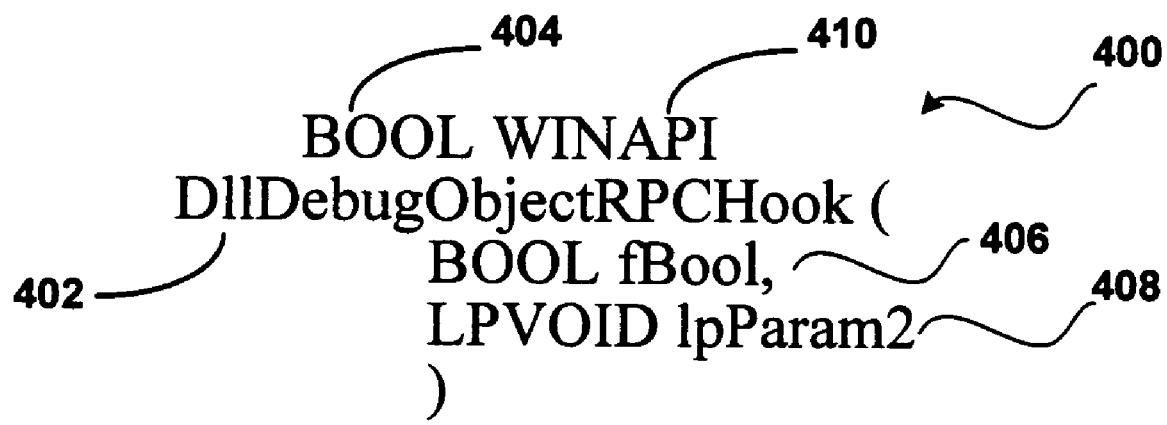
FIG. 4 is an exemplary function declaration used in executing an arbitrary function in another process in accordance with one embodiment of the invention.

Suppose now that a function called DllDebugObjectRPCHook in a target process is to be executed from a first process. Perhaps DllDebugObjectRPCHook expects two input parameters a boolean and an undefined pointer parameter, and returns a single Boolean result. As written in C++, an exemplary target function may be declared as illustrated in FIG. 4.

Declaration 400 defines function DllDebugObjectRPCHook 402 as follows: the function DllDebugObjectRPCHook 402 returns a single Boolean result 404; DllDebugObjectRPCHook 402 expects two parameters, a Boolean parameter named fBool 406 and an undefined pointer parameter named lpParam2 408 and the WINAPI calling convention 410 is used.

To execute DllDebugObjectRPCHook in one embodiment of the invention, space is allocated in a target process, and a stub function is written into the allocated space. The stub function inserted into the target function expects to receive the location of the function to be executed from a function in the process that calls it. The calling function may pass the stub function a pointer to the location of the function DllDebugObjectRPCHook (for example, a memory location such as ESP-0xc) and the location of the values for any parameters needed by DllDebugObjectRPCHook as offsets from the location of DllDebugObjectRPCHook. Alternatively, the calling function may pass the stub function other information from which the stub function can identify the function to be executed, such as, for example, the name of the function to be executed, DllDebugObjectRPCHook.

In one embodiment of the invention, the values to which the parameters are to be initialized are not passed to the stub function. Instead the stub function includes code that pushes the desired values onto the stack. Assume, for example, that to obtain the desired result when executing DllDebugObjectRPCHook, fBool must be initialized to FALSE (0) and lpParam2 must be initialized to NULL (0). In this case, when the stub function is instantiated, it may receive only the address of the function to execute, DllDebugObjectRPCHook. When the stub function executes, the stub function pushes 0 onto the stack for fBOOL and pushes 0 onto the stack for lpParam2. The stub function then calls the function to execute, DllDebugObjectRPCHook. DllDebugObjectRPCHook retrieves the values of its required parameters fBOOL and lpParam2 from the stack and executes, returning the results of execution to the stub function. The stub function may then pass the results of execution to the calling process or may pass the location of the results of execution to the calling process.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Similarly it will be understood that although the test framework is described within the context of an automated way of testing software, the invention is not so limited and may be used wherever the scheduling of processes within a standardized format is useful, as for example in the context of business processes. Therefore, the present invention should not be limited to any single embodiment, but rather should be construed in breadth and scope in accordance with the appended claims.

What is claimed is:

1. A system for executing a function in a second process from a first process, comprising:
    a processor;
    a computer readable storage medium in communication with the processor; and
    a function controller, wherein the function controller is configured to:
        allocate space in the second process from the first process;
        write a stub function into the allocated space in the second process; and
        pass a single parameter to the stub function written into the allocated space in the second process, the single parameter identifying the function within the second process to execute, and at least one parameter required by the function to execute, wherein the first process controls the second process by executing the stub function, wherein the result of executing the function to execute is returned to the first process by providing a pointer to the first process, the pointer pointing to stored data, the stored data comprising the result of executing the function to execute, and wherein the pointer is configured to point to memory in the second process.

2. The system of claim 1, wherein the function controller is further configured to return the result of execution of the function to the first process.

3. The system of claim 1, wherein the function within the second process to execute requires a plurality of parameters.

4. The system of claim 1, wherein the single parameter passed to the stub function comprises a pointer to a location in memory in the second process.

5. The system of claim 4, wherein the location in the memory comprises an address, the address comprising the location of the function to execute in the second process.

6. The system of claim 5, wherein the address comprises the location of at least one parameter required by the function to execute.

7. A method for a first process to control a second process, wherein said method is performed on a computer, the method comprising:
    allocating space within the second process from the first process;
    writing a stub function into the allocated space within the second process; and
    passing a single parameter to the stub function written into the allocated space in the second process, the single parameter identifying the function within the second process to execute, and at least one parameter required by the function to execute, wherein the first process controls the second process by executing the stub function, wherein the result of executing the function to execute is returned to the first process by providing a pointer to the first process, the pointer pointing to stored data, the stored data comprising the result of executing the function to execute, and wherein the pointer is configured to point to memory in the second process.

8. The method of claim 7, wherein the single parameter passed to the stub function comprises an address in memory within the second process.

9. The method of claim 7, wherein the function in the second process to be executed by the stub function in the second process is identified by providing a pointer to a location in memory in the second process at which the function to be executed is stored.

10. The method of claim 9, wherein at least one parameter required by the function to be executed is identified by providing an offset from the location in memory at which the function to be executed is stored.

11. The method of claim 9, further comprising receiving from the stub function in the second process a result of executing the function identified by the pointer to the location in memory.

12. The method of claim 9, wherein the stub function is executed by creating a thread in the second process to execute the stub function.

13. A computer-readable storage medium having computer-executable instructions for a first process to cause the execution of a function within a second process stored thereon, the computer-executable instructions comprising instructions for:

allocating space within the second process from the first process;

writing a stub function into the allocated space within the second process; and passing a single parameter to the stub function written into the allocated space in the second process, the single parameter identifying the function within the second process to execute, and at least one parameter required by the function to execute, wherein the first process controls the second process by executing the stub function, wherein the result of executing the function to execute is returned to the first process by providing a pointer to the first process, the pointer pointing to stored data, the stored data comprising the result of executing the function to execute, and wherein the pointer is configured to point to memory in the second process.

14. The computer-readable storage medium of claim 13, further comprising instructions for receiving from the stub function the result of executing the function in the second process.

15. The computer-readable storage medium of claim 14, wherein the result of executing the function in the second process is stored at a location received from the stub function as an output parameter.

16. The computer-readable storage medium of claim 13, wherein the function to execute requires a plurality of input parameters.

17. The computer-readable storage medium of claim 16, wherein the sub function initializes the plurality of input parameters to values located at specified offsets from the address in the memory pointed to by the pointer.

* * * * *